United States Patent [19]

Shu et al.

[11] Patent Number: 4,520,344
[45] Date of Patent: May 28, 1985

[54] WHEEL TROUBLE DETECTING AND WARNING DEVICE

[76] Inventors: Si-Yan Shu; Shing-Wu P. Tzeng, both of No. 124, Long Tong Rd., Chung Li, Taiwan

[21] Appl. No.: 406,953

[22] Filed: Aug. 10, 1982

[51] Int. Cl.³ .............................................. B60C 23/02
[52] U.S. Cl. ................................... 340/58; 200/61.22
[58] Field of Search .............. 340/58; 73/146.5, 146.8; 116/34 R; 200/61.22

[56] References Cited

U.S. PATENT DOCUMENTS

| 3,944,971 | 3/1976 | Ramirez | 340/58 |
| 4,103,282 | 7/1978 | Cook | 116/34 R |
| 4,187,495 | 2/1980 | Mitchell | 340/58 |

Primary Examiner—John W. Caldwell, Sr.
Assistant Examiner—Ellwood G. Harding
Attorney, Agent, or Firm—Armstrong, Nikaido, Marmelstein & Kubovcik

[57] ABSTRACT

A wheel trouble detecting and warning device for wheeled motor vehicles, comprising tire pressure detecting valves, an air horn and a plunger unit to be mounted on each wheel, the tire pressure detecting valves being adapted to allow air from the tire to be supplied to the air horn to produce a warning sound when the tire is over or under inflated. In the meantime air is also supplied to a plunger unit which is then caused to activate an electrical switch mounted on the wheel axle housing to flash a warning lamp provided in the vehicle. The wheel is further provided with a dog member fixedly mounted on the wheel rim to activate the electrical switch when the wheel wobbles as a result of loosening of the wheel bolts or failure of the wheel bearing.

4 Claims, 7 Drawing Figures

WHEEL TROUBLE DETECTING AND WARNING DEVICE

BACKGROUND OF THE INVENTION

Wheeled motor vehicles require regular maintainance and inspection to assure both the optimum performance of the vehicles as well as the safety of the passengers. However, such troubles as the over or under inflation of tires and the loosening of wheel mountings due to a variety of reasons frequently happen without being noticed by the driver while driving. This is because there has not been a means to detect and to warn the driver of such troubles before an accident occurs.

This invention therefore offers a device that is capable of detecting the wheel troubles of a motor vehicle while being driven and warning the driver of the troubles before an accident occurs.

SUMMARY OF THE INVENTION

This invention offers a wheel trouble detecting and warning device, comprising tire pressure detecting valves and an air horn to be mounted on each wheel of a motor vehicle, the tire pressure detecting valves being adapted to allow the air in the tire to be delivered to the air horn when the tire is over or under inflated, i.e., when the air pressure in the tire increases beyond a predetermined upper limit or decreases below a predetermined lower limit. The device of this invention further includes a plunger unit to be mounted on the wheel rim to be operated by the air of the tire when the tire is over or under inflated, so as to actuate an electric switch provided on the wheel axle housing to light a warning lamp provided on the dashboard of the vehicle. Furthermore, a dog member is provided on the wheel rim to activate the electrical switch when the wheel wobbles as a result of a loosening of the wheel mounting from the failure of wheel bearings or the loosening of wheel bolts, so as to light the warning lamp.

Figure 1:
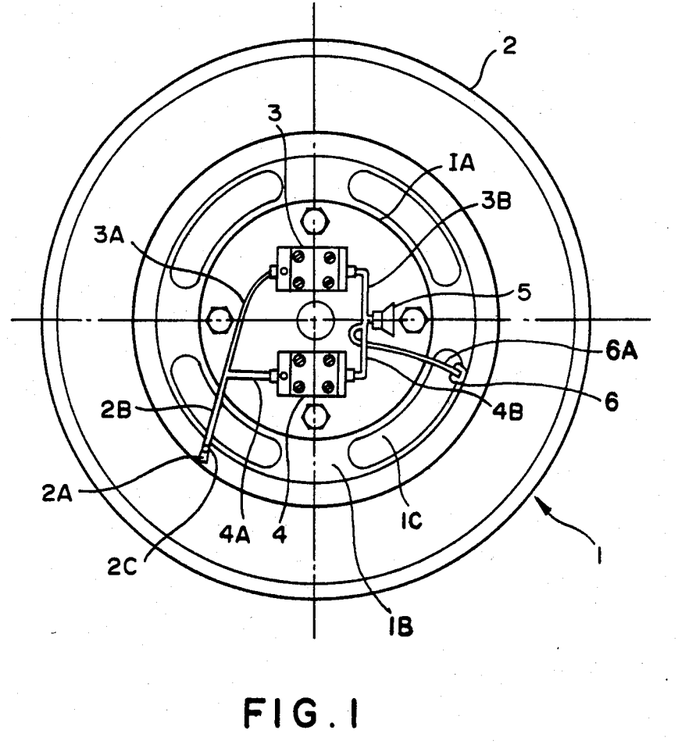
FIG. 1 is a schematic front view of a first embodiment of the wheel trouble detecting and warning device of this invention, showing the general arrangement of the tire pressure detecting valves mounted onto a wheel.

As shown in FIG. 1 the tire pressure detecting valves of the wheel trouble detecting and warning device of this invention comprises a low-pressure valve unit 3 and a high-pressure valve unit 4 detachably mounted onto a mounting plate 1A which is mounted on the wheel hub 1B of a wheel assembly 1 having a tire 2 provided with a valve 2A through which air is pumped into tire 2. Low-pressure valve unit 3 and high-pressure valve unit 4 are respectively provided with inlet tubes 3A and 4A connected to a common inlet tube 2B which is connected to valve 2A with a connection fitting 2C that keeps valve 2A always open so that air from tire 2 is admitted to common inlet tube 2B. The low-pressure valve unit 3 and high-pressure valve unit 4 are further provided with outlet tubes 3B and 4B connected both to an air horn 5 which is also detachably mounted onto mounting plate 1A, and to a plunger unit 6 with tube 6A passing through an opening 1C of wheel hub 1B.

Figure 2:
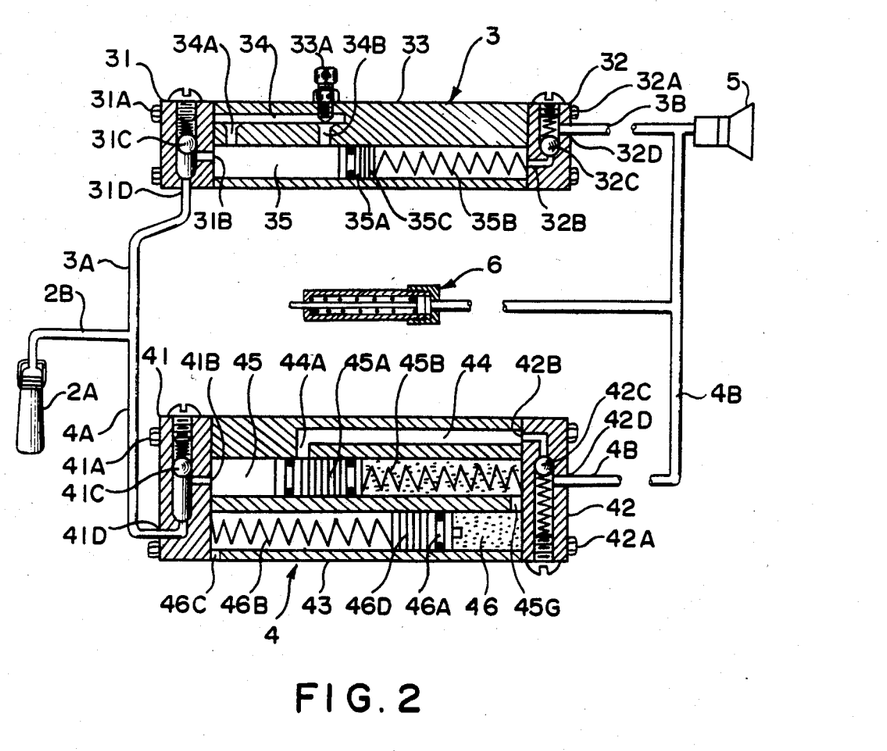
FIG. 2 is a schematic, cross sectional view of the tire pressure detecting valves shown in FIG. 1, showing their construction and condition under normal operation.

Referring to FIG. 2, low-pressure valve unit 3 comprises a valve body 33 provided with a bore 35 in which a piston 35A is slidably inserted, first valve head 31 being detachably mounted with cap screws 31A at one (first) end and second valve head 32 detachably mounted with cap screws 32A at the other (second) end of valve body 33; first valve head 31 having an inner port 31B open to the first end of bore 35, and outer port 31D connected to common inlet tube 2B through inlet tube 3A, and a check valve 31C which allows air to flow only one direction from outer port 31D to inner port 31B; second valve head 32 having an inner port 32B open to the second end of bore 35, an outer port 32D connected to air horn 5 through outlet tube 3B, and a check valve 32C which allows air to flow only one direction from inner port 32B to outer port 32D. Valve body 33 is further provided with a by-pass 34 having an inlet port 34A open to first end of bore 35 and an outer port 34B open to bore 35 but provided at a suitable distance away from inlet port 34A towards the second end of bore 35. Piston 35A is provided with a spring 35B urging piston 35A toward the first end of bore 35, and spacers 35C to be explained later. Outlet port 34B is provided with a needle valve 33A capable of selectively closing and opening the outlet port 34B.

High-pressure valve unit 4, as shown in FIG. 2, comprises a valve body 43 provided with a main bore 45 in which a main piston 45A is slidably inserted, an auxiliary bore 46 in parallel with main bore 45, a by-pass 44 having an inlet port 44A open to main bore 45, a first valve head 41 detachably mounted with cap screws 41A at one (first) end and a second valve head 42 detachably mounted at the other (second) end of valve body 43 with cap screws 42A; first valve head 41 having an inner port 41B open to the first end of main bore 45, an outer port 41D connected to common inlet tube 2B through inlet tube 4A, and a check valve 41C allowing the air to flow one direction from outer port 41D to inner port 41B; second valve head 42 having an inner port 42B open to by-pass 44, an outer port 42D connected to air horn 5 through outlet tube 4B, and a check valve 42C allowing the air to flow one way from inner port 42B to outer port 42D.

Figure 3:
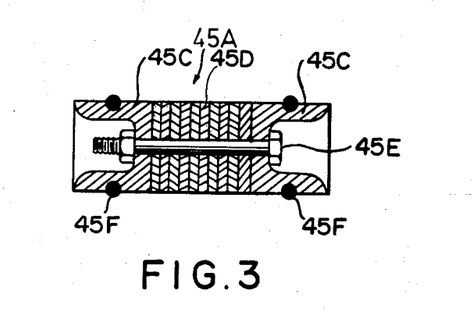
FIG. 3 is a cross sectional view of the main piston employed in the high pressure valve unit of the device of this invention.

As shown in FIG. 3, main piston 45A is composed of a pair of piston members 45C connected by a connecting bolt 45E with a plurality of spacers 45D disposed between the two piston members 45C, each piston member 45C having a seal ring 45F.

Main piston 45A is further provided with a spring 45B urging said main piston 45A toward the first end of main bore 45. Auxiliary bore 46 is provided with an auxiliary piston 46A slidably inserted therein and a spring 46B urging auxiliary piston 46A toward the second end of auxiliary bore 46. A plurality of spacers 46D are provided between auxiliary piston 46A and spring 46B to be explained later. At the second end of main and auxiliary bores 45 and 46 an orifice 45G is provided so as to communicate the second end of main and auxiliary bores 45 and 46. Inlet port 44A is so disposed that inlet port 44A is closed when main piston 45A is at the ultimate end position of the first end of main bore 45 and opened when main piston 45A is moved a pre-determined distance towards the second end of main bore 45. A suitably quantity of fluid fills the space between main piston 45A and the second end of main bore 45 when main piston 45A is at the ultimate end position of the first end of main bore 45 and auxiliary piston 46A is at the ultimate end position of the second end of auxiliary bore 46, so that the fluid may pass through orifice 45G and enter the space between auxiliary piston 46A and the second end of auxiliary bore 46 when main piston 45A is pushed to move towards the second end of main bore 45. A filler hole and a vent hole, not shown, are provided in the valve body to facilitate the filling of said space with liquid. The filler hole and the vent hole are properly plugged after the filling of the liquid. Orifice 45G is adapted to restrict the flow of a large quantity of fluid so as to prevent pistons 45A and 46A from moving rapidly, or to perform as a dashpot. Orifice 45G permits the flow of the fluid in either way at a restricted speed. Auxiliary bore 46 is provided with a vent hole 46C at the first end thereof so as to eliminate a back pressure on the back side (first end side) of auxiliary piston 46A when auxiliary piston 46A is pushed towards the first end of auxiliary bore 46.

The tire pressure detecting valves of the device of this invention are further provided with a plunger unit 6 connected to outlet tubes 3B and 4B, to be described below with reference to FIG. 4.

Figure 4:
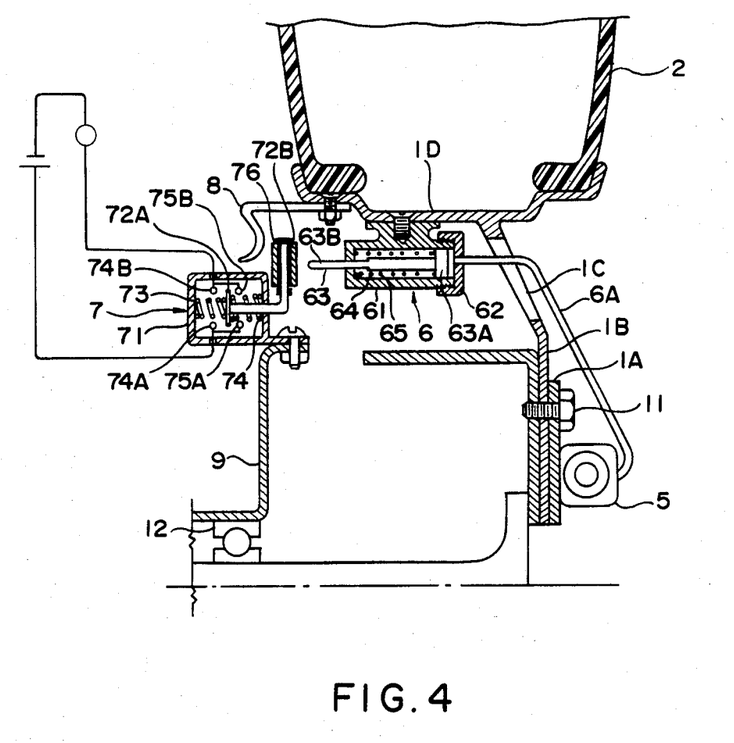
FIG. 4 is a fragmentary, cross sectional view of a wheel provided with the plunger unit and the electrical switch of the first embodiment of this invention, showing the general arrangement thereof.

FIG. 4 shows a fragmentary, cross sectional view of a wheel provided with a tire pressure detecting valves (not shown), a plunger unit 6, an electrical switch 7 and a dog member 8. The brake mechanism which is generally provided in the wheel is omitted from the drawing. As shown in FIG. 4, plunger unit 6 is provided with a plunger case 61 which is fixedly mounted onto the inner side of the wheel rim 1D, plunger case 61 having a bore 65 in which a plunger 63 is slidably inserted, plunger 63 having a head 63A in air-tight engagement with the wall of bore 65 and a tail end 63B freely extending out of plunger case 61, a cap 62 adapted to connect tube 6A, which passes through opening 1C of wheel hub 1B, to plunger case 61 so that when air is admitted to plunger unit 6 through tube 6A the air acts on head 63A of plunger 63 to cause tail end 63B to extend. Plunger 63 is further provided with a spring 66 which urges plunger 63 to retract as soon as the supply of air to plunger unit 6 is cut off.

In a suitable place on wheel axle housing 9 an electrical switch 7 is mounted to correspond with plunger 63, as shown in FIG. 4. Electrical switch 7 comprises a housing 71, a switch member 72A provided with a lever 72B, a first pair of terminals 74A, 74B and a second pair of terminals 75A, 75B, with switch member 72A being disposed between the first and second pairs of terminals with springs 73, 74 urging switch member 72A to remain at mid position between the two pairs of terminals which are electrically connected to a warning lamp provided on the dashboard of the vehicle so that when switch member 72A is moved towards either side to close either pair of terminals, the warning lamp is lit accordingly.

Lever 72B is so formed to correspond with tail end 63B of plunger 63 that tail end 63B pushes lever 72B to move switch member 72A towards the first pair of terminals 74A and 74B when air is supplied to plunger unit 6, so as to close the first pair of terminals.

In another suitable place on wheel rim 1D a dog member 8 is fixedly mounted, as shown in FIG. 4. Dog member 8 is so formed and arranged to correspond with lever 72B so that switch member 72A is moved towards the second pair of terminals 75A and 75B when the wheel wobbles as a result of loosening of wheel bolts 11 or failure of wheel bearing 12, so as to close accordingly the second pair of terminals 75A and 75B.

Since plunger unit 6 and dog member 8 are mounted on wheel 1 which rotates while electrical switch 7 is mounted on wheel axle housing 9 which does not rotate with the wheel, the engagement of plunger 63 or dog member 8 with lever 72B of electrical switch 7 is performed in periodic or intermittent manner and thus the warning lamp is actually caused to flash instead of producing a steady light, so that an effective warning is provided.

In order to facilitate the engagement of plunger 63 or dog member 8 with lever 72B of electrical switch 7, lever 72B may be provided with a roller 76 as shown in FIG. 4.

The operation and functions of the device of this invention will now be described as follows.

Referring to FIG. 2, when tire pressure is within the pre-set range, piston 35A of low-pressure valve unit 3 and main piston 45A of high-pressure valve unit 4 are in positions where the force of the tire pressure acting on the pistons is balanced by springs 35B, 45B respectively, so that in low-pressure valve unit 3 outlet port 34B does not communicate with inner port 32B and in high pressure valve unit 4 inlet port 44A is closed and no air is admitted to either air horn 5 or plunger unit 6 from either low-pressure valve unit 3 or high-pressure valve unit 4.

Figure 5:
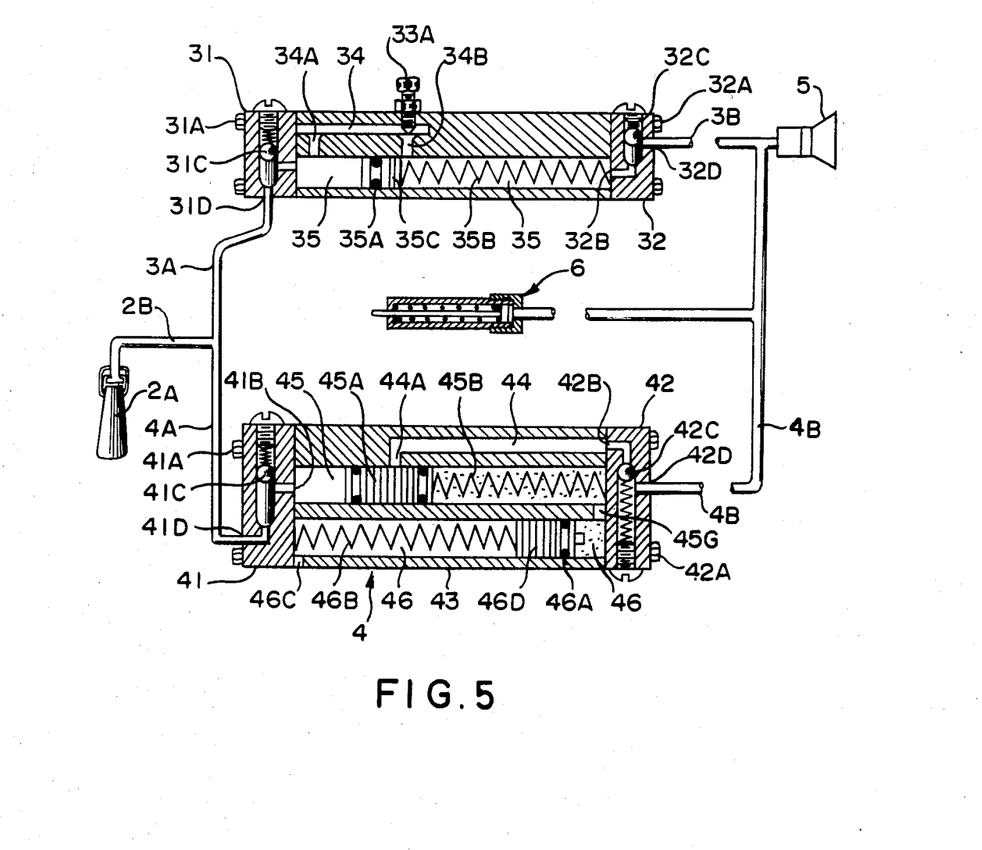
FIG. 5 is a schematic, cross sectional view of the tire pressure detecting valves shown in FIG. 1, showing their principle of operation when the tire pressure decreases below a pre-set lower limit.

When the tire pressure decreases below the pre-set lower limit, piston 35A of low-pressure valve unit 3 and main piston 45A of high-pressure valve unit 4 move towards the first heads 31 and 41 respectively; and as a result, piston 35A of low pressure valve unit 3 moves over outlet port 34B as shown in FIG. 5, allowing air from the tire to flow through inlet port 34A, by-pass 34, outlet port 34B, bore 35 behind piston 35A, inner port 32B, and to push check valve 32C to open, and finally to be admitted to both air horn 5 to produce a warning sound, and plunger unit 6 to flash the warning lamp on the dashboard of the vehicle. In the meantime inlet port 44A of high-pressure valve unit 4 remains closed by main piston 45A, thus allowing no air to flow from the tire through high pressure valve unit 4 to air horn 5 and plunger unit 6.

Figure 6:
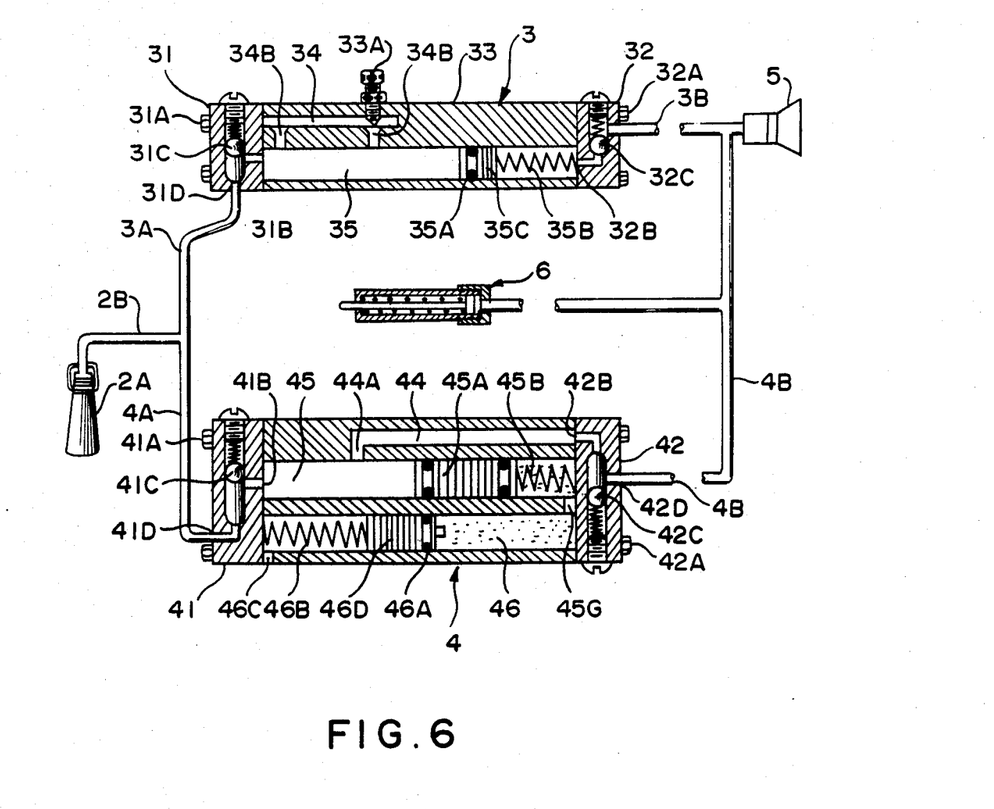
FIG. 6 is a schematic, cross sectional view of the pressure detecting valves shown in FIG. 1, showing their principle of operation when the tire pressure increases beyond a pre-set upper limit.

When the tire pressure increases beyond the pre-set upper limit, piston 35A of low pressure valve unit 3 and main piston 45A of high pressure valve unit 4 are pushed back so as to clear outlet port 34B of low pressure valve unit 3 and inlet port 44A of high pressure valve unit 4 as shown in FIG. 6. As a result, the communication between outlet port 34B and inner port 32B is interrupted by piston 35A, and in the meantime the air from the tire is allowed to flow through inner port 41B, bore 45, inlet port 44A, by-pass 44 and inner port 42B of high pressure valve unit 4, causing check valve 42C to open, and finally to be admitted to both air horn 5 and plunger unit 6. In this case the air from the tire is not allowed to flow through low-pressure valve unit 3.

When the tire has been replaced and has to be inflated from the beginning, screw 33A is operated to close port 34B so that air is not undesirably admitted to air horn 5 and plunger unit 6. As soon as the tire is inflated to the normal pressure, screw 33A is turned backwards to open port 34B to enable the normal performance of low-pressure valve unit 3.

In cases where tire pressure increases suddenly, as when the vehicle is driven over a rut, the movement of main piston 45A is restricted because the flow of the fluid from main bore 45 behind piston 45A to auxiliary bore 46 behind piston 46A is restricted by orifice 45G, thus preventing main piston 45A from moving to allow port 44A to be open to bore 45 before tire pressure has returned to normal.

To set or adjust the pressure range as desired, first valve heads 31 and 41 are first disassembled and spacers 45D, 46D and 35C are added or removed, until the desired pressure range is obtained.

Figure 7:
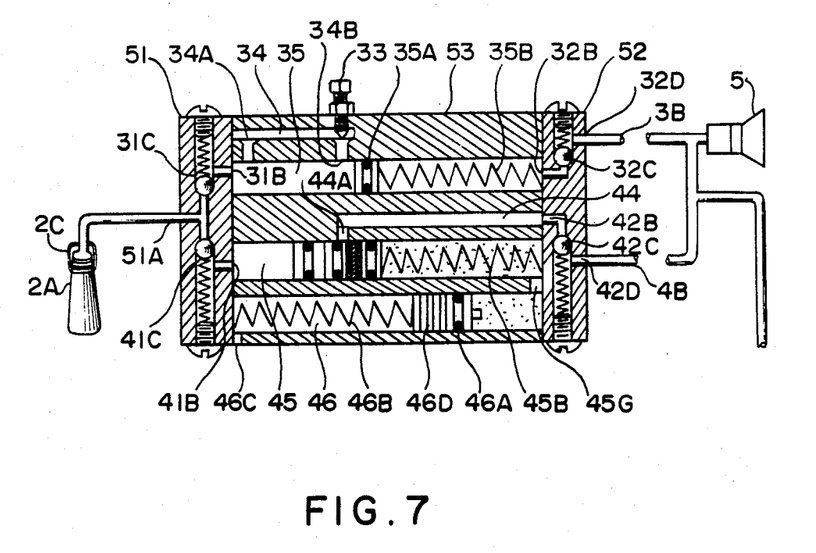
FIG. 7 is a schematic, cross sectional view of the tire pressure detecting valves of a second embodiment according to this invention.

FIG. 7 shows a second embodiment of the device of this invention. In this embodiment the low pressure valve unit 3 and high pressure valve unit 4 of the first embodiment are combined into one integral unit, which comprises a valve body 53 having a low pressure bore 35, high pressure bore 45 and auxiliary bore 46, a first head 51 detachably mounted to a first end of valve body 53, and a second head 52 detachably mounted to second end of valve body 53. First head 51 is provided with an outer port 51A connected to valve 2A of the tire, not shown, an inner port 31B open to the first end of low pressure bore 35, first check valve 31C adapted to allow air from outer port 51A to flow one way to inner port 31B, another inner port 41B open to the first end of high pressure bore 45, and second check valve 41C adapted to allow air from outer port 51A to flow one way to inner port 41B.

Low pressure bore 35 is provided with a by-pass 34 having both inlet port 34A disposed adjacent to and open to the first end of low pressure bore 35, and outlet port 34B disposed a suitable distance from inlet port 34A and open to low pressure bore 35. High pressure bore 45 is provided with a by-pass 44 having an inlet port 44A open to high pressure bore 45 at a suitable position, said by-pass extending toward the second end of valve body 53. Second head 52 is provided with an inner port 32B open to the second end of low poressure bore 35, outer port 32D connected to air horn 5 through tube 3B, third check valve 32C adapted to allow air from inner port 32B to flow one way to outer port 32D, another inner port 42B open to by-pass 44, another outer port 42D connected to air horn 5 through tube 4B, and fourth check valve 42C adapted to allow air from inner port 42B to flow one way to outer port 42D. Other arrangements are the same as those the first embodiment.

The device of the second embodiment gives a compact construction most applicable to the rear wheels of trucks or buses where two tires are mounted on one wheel axle.

We claim:

1. A wheel trouble detecting and warning device for wheeled motor vehicles provided with air-inflated tires, comprising:

an air horn mounted onto a wheel hub of a wheel of the vehicle;

a first valve unit mounted on the wheel hub, to which first valve unit air from the tire is supplied, said first valve unit being adapted to allow air from the tire to be admitted to said air horn when the pressure of the air decreases below a pre-determined lower limit, said first valve unit including a first bore having a first end and a second end, a first check valve adapted to allow air from the tire to flow one way into said first bore from said first end, a by-pass having an inlet port open to said first end of said first bore and an outlet port open to said first bore, said outlet port being disposed at a suitable distance from said inlet port, a first piston slidably inserted in said first bore, a spring adapted to urge said piston towards said first end, a second check valve adapted to allow air to flow one way from said second end of said first bore to said air horn, a needle valve adapted to selectively open and close said outlet port of said by-pass, said first piston and spring being so arranged that said first piston is disposed to allow said outlet port to communicate with said second end to form a passage when the pressure of air from the tire decreases below said predetermined lower limit; and a second valve unit mounted on the wheel hub, to which second valve unit air from the tire is supplied, said second valve unit being adapted to allow air from the tire to be admitted to said air horn when the pressure of the air from the tire increases beyond a predetermined upper limit, said second valve unit including a second bore having a first end and a second end, a third check valve adapted to allow air from the tire to flow one way into said second bore from said first end of said second bore, a second by-pass having an inlet port open to said second bore and an outlet provided with a fourth check value which is adapted to allow air from said second by-pass to flow one way to said air horn, a second piston slidably inserted in said second bore, a second spring adapted to urge said second piston toward said first end of said second bore, a restriction means adapted to restrict the movement of said second piston when the pressure of the air from the tire increases suddenly, said second piston and second spring being so arranged to communicate said first end of said second bore with said inlet port of said second by-pass to form a passage when the pressure of air from the tire increases beyond the pre-determined upper limit and to close said inlet port of said second by-pass when the pressure of air from the tire is below the predetermined upper limit.

2. A wheel trouble detecting and warning device as recited in claim 1, which further comprises a plunger unit mounted onto the wheel rim and an electrical switch mounted onto a stationary wheel axle housing; said plunger unit having a plunger extending toward said wheel axle housing and being operable by air supplied from either said first valve unit or said second valve unit to activate said electrical switch; and a warning lamp adapted to be lit when said electrical switch is activated.

3. A wheel trouble detecting and warning device as recited in claim 1, wherein said restriction means is an auxiliary bore having a first end and a second end, an auxiliary piston slidably inserted in said auxiliary bore, an auxiliary spring urging said auxiliary piston towards said second end of said auxiliary bore, said second end of said auxiliary bore communicating with said second end of said second bore of said second valve unit through an orifice, and the space between said second piston and said second end of said second bore, and said auxiliary piston and said second end of said auxiliary bore being filled with a fluid.

4. A wheel trouble detecting and warning device as recited in claim 2, which further comprises a dog member fixedly mounted onto the wheel rim to correspond with said electrical switch so as to activate said electrical switch when said wheel wobbles.

* * * * *